(12) United States Patent
Foltin

(10) Patent No.: US 8,941,303 B2
(45) Date of Patent: Jan. 27, 2015

(54) METHOD FOR DETERMINING AN ILLUMINATION RANGE OF AT LEAST ONE HEADLIGHT AND METHOD FOR CALIBRATING A LIGHT EMISSION OF AT LEAST ONE HEADLIGHT OF A VEHICLE

(75) Inventor: Johannes Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 13/590,615

(22) Filed: Aug. 21, 2012

(65) Prior Publication Data

US 2013/0049588 A1 Feb. 28, 2013

(30) Foreign Application Priority Data

Aug. 23, 2011 (DE) .......................... 10 2011 081 392

(51) Int. Cl.
*B60Q 1/08* (2006.01)
*G01C 3/08* (2006.01)
*B60Q 1/115* (2006.01)

(52) U.S. Cl.
CPC ............ *B60Q 1/115* (2013.01); *B60Q 2200/38* (2013.01)
USPC .......................................... 315/82; 356/4.07

(58) Field of Classification Search
USPC ............ 315/82, 80; 340/425.5, 438; 356/4.07
See application file for complete search history.

(56) References Cited

U.S. PATENT DOCUMENTS 5,193,894 A * 3/1993 Lietar et al. ................... 362/466
6,373,378 B1 * 4/2002 Ewerhart et al. ........... 340/425.5

FOREIGN PATENT DOCUMENTS

| AT | 507199 | 3/2010 |
|---|---|---|
| DE | 102 54 806 | 6/2004 |
| DE | 10 2007 014 295 | 10/2007 |
| DE | 10 2007 001 103 | 7/2008 |
| DE | 10 2008 011 699 | 9/2008 |
| DE | 10 2007 049 619 | 4/2009 |
| DE | 10 2008 031 159 | 1/2010 |
| DE | 10 2010 048 689 | 5/2011 |
| DE | 10 2010 029 149 | 11/2011 |
| EP | 0 691 534 | 1/1996 |
| EP | 2 050 644 | 4/2009 |
| EP | 2 204 771 | 7/2010 |

* cited by examiner

Primary Examiner — Daniel D Chang
(74) Attorney, Agent, or Firm — Kenyon & Kenyon LLP

(57) ABSTRACT

A method for determining an illumination range of at least one headlight of a vehicle includes a step of detecting at least one road-marking feature, which is illuminated by the at least one headlight, a step of ascertaining a distance between the vehicle and the at least one illuminated road-marking feature, and a step of determining the illumination range of the at least one headlight, using the ascertained distance.

16 Claims, 2 Drawing Sheets

METHOD FOR DETERMINING AN ILLUMINATION RANGE OF AT LEAST ONE HEADLIGHT AND METHOD FOR CALIBRATING A LIGHT EMISSION OF AT LEAST ONE HEADLIGHT OF A VEHICLE

CROSS REFERENCE TO RELATED APPLICATION

The present application claims priority to Application No. DE 10 2011 081 392.6, filed in the Federal Republic of Germany on Aug. 23, 2011, which is expressly incorporated herein in its entirety by reference thereto.

FIELD OF INVENTION

The present invention relates to a method for determining an illumination range of at least one headlight of a vehicle, a method for calibrating a light emission of at least one headlight of a vehicle, as well as a device that is configured to implement the steps of such a method.

BACKGROUND INFORMATION

The light intensity of vehicle headlights is being increased more and more. If the headlights are not adjusted correctly, they may blind other road users. In some headlight systems, such as xenon light sources, automatic illumination range control is mandatory. Efforts are being made to develop a marketable commodity out of "Xenon Light," which has a lower light intensity than classic xenon light. "Xenon Light" is at the legally permissible limit, at which automatic illumination range control is no longer required, but it is brighter than classic incandescent halogen lamps. In the case of halogen headlights, incorrect adjustment may often cause glare, as well. The headlights may be adjusted upon installation of the headlights, using special devices. When a lamp is exchanged, for example, it may not be seated exactly at the desired position after the exchange, due to tolerances, which may result in glare. It is estimated that incorrectly adjusted headlights in vehicles are common. One control concept, dynamic illumination range control, uses axle sensors in order to determine the load state of the vehicle and compensate for the changed illumination range.

German Application No. DE 102 54 806 B4 shows a method for processing data of at least two data sources in a motor vehicle.

SUMMARY

Against this background, the present invention puts forth an improved method for determining an illumination range of at least one headlight of a vehicle, an improved method for calibrating a light emission of at least one headlight of a vehicle, an improved apparatus and an improved computer program product, according to the present invention. Advantageous refinements are described in the following description.

The present invention is based on the realization that an illumination range of a vehicle headlight may be determined with the aid of road-marking features. In this context, the road-marking features are illuminated by the vehicle headlight and consequently detected. If the distance from the illuminated road-marking features is known, then the illumination range may be determined on the basis of that. Knowledge of the illumination range may be used for calibrating the vehicle headlight.

One advantage of the present invention is that the illumination range of the headlight of the vehicle may be determined without external measuring devices, in a garage, a test stand or the like, which provides simplification and cost savings. In addition, the illumination range may be determined continuously while driving, the present invention doing without a vehicle-loading sensor system or the like. In addition to simplification and cost savings, the present invention also improves traffic safety, since adjustments may be made at the headlights, using the determined illumination range, in order to prevent other traffic users from being blinded.

The present invention provides a method for determining an illumination range of at least one headlight of a vehicle, the method having the following steps:

detecting at least one road-marking feature that is illuminated by the at least one headlight;

ascertaining a distance between the vehicle and the at least one illuminated road-marking feature; and determining the illumination range of the at least one headlight, using the ascertained distance.

The vehicle may be a motor vehicle, for example, a passenger car or cargo truck. The at least one headlight may be, for example, a front headlight for illuminating the roadway. The at least one road-marking feature may have a light-reflecting region and, additionally or alternatively, a color different from the roadway. The detection of the at least one road-marking feature and, therefore, the ascertainment of the distance between the same and the vehicle, as well, may be carried out based on the light-reflecting region and/or the color different from the roadway. The ascertaining may be carried out, based on an image of the road-marking feature. The image may have been acquired by an image acquisition device of the vehicle. The image may be evaluated by an image evaluation unit, in order to detect the road-marking feature.

In the detection step, a guide post and, additionally or alternatively, a boundary line may be detected as the at least one road-marking feature. Thus, the at least one road-marking feature may include a guide post and, additionally or alternatively, a boundary line or a section of the same. The boundary line may be, for example, a center line of the roadway broken at essentially regular intervals. The guide post may be an individual, fixed guide post or a guide post integrated into a guard rail. The guide post may be at a defined distance from a preceding guide post and/or from a succeeding guide post. This exemplary embodiment has the advantage that road-marking features, which are normally present on a roadway, may be used for determining the illumination range. In addition, an arrangement of the road-marking features with respect to one another may be defined or standardized or subject to a detectable regularity. If, for example, a distance between consecutive road-marking features is known, then this known distance may be used for ascertaining the distance between the vehicle and the at least one illuminated road-marking feature. A value of the distance between consecutive road-marking features may be predetermined and, e.g., read out of a memory, or determined while driving. Thus, the illumination range may be reliably determined on different roadways.

In particular, a reflection of light, emitted by the at least one headlight, at a reflector element of the at least one road-marking feature may be detected in the detecting step. In this context, the reflection may originate at at least one partial region of a surface of the at least one road-marking feature. In this connection, the reflector element may be a reflector of a guide post or the colored surface of a boundary line. This exemplary embodiment provides the advantage that the at least one road-marking feature may be detected highly reliably, accurately and safely in this manner. In addition, the road-marking feature itself may be formed by the reflector element.

In this context, the method may have a step of making a threshold value decision, in order to check if a brightness value of the reflection is above or below a specifiable brightness threshold value. In this connection, in the ascertaining step, the distance may be ascertained as a function of the threshold value decision. The brightness threshold value may represent a boundary between a light cone generated by the at least one headlight and illumination by other light sources, such as other vehicles, street lights, moonlight and the like. If the brightness value of a road-marking feature is below the brightness threshold value, then a distance between the vehicle and this road-marking feature cannot be ascertained in the ascertaining step. However, if the brightness value of a road-marking feature is above the brightness threshold value, then the distance between the vehicle and this road-marking feature may be ascertained in the ascertaining step. This exemplary embodiment provides the advantage that the illumination range may be determined even more accurately, since only road-marking features, which are actually illuminated by the at least one headlight of the vehicle, are considered during the determination. Therefore, road-marking features, which are illuminated by a headlight of another vehicle, are prevented from being detected and used for determining the illumination range.

In the detecting step, the at least one road-marking feature, which is illuminated by the at least one headlight, may also be ascertained using an image picked up by a vehicle camera. The vehicle camera may be a camera aligned in the direction of forward travel of the vehicle, an image processing device, and/or the like. The vehicle camera may be mounted, for example, in an interior of the vehicle. This exemplary embodiment provides the advantage that with the aid of a vehicle camera, the at least one road-marking feature may be detected in a simple and accurate manner.

In the ascertaining step, the distance may be ascertained on the basis of data of a distance sensor system, object tracking system, image evaluation unit, and/or trip data. The distance from a road-marking feature, e.g., a reflector, may be measured or ascertained by measuring a distance covered up to passing the road-marking feature. In the case of a determination by means of trip data, position information or position differences may be used, which may come from a navigation device or the like, for example. It is also possible to directly ascertain the distance from the road-marking feature, using distance-measuring sensors. This may be accomplished, for example, using a stereo camera, using radar, using Lidar, using time of flight, etc. The position in an image and the vehicle's own movement may be used for estimating whether or not the road-marking feature would have to be visible. This exemplary embodiment provides the advantage that the distance and, consequently, also the illumination range, may be ascertained highly accurately.

If two or more types of distance ascertainment are used in combined form, this may increase the accuracy of the distance ascertainment even further. A suitable type of distance ascertainment may also be selected as a function of current conditions of the surrounding area of the vehicle.

In the detecting step, at least one further road-marking feature, which is illuminated by the at least one headlight, may be detected. In addition to this, at least one further distance between the vehicle and the at least one further, illuminated road-marking feature may be ascertained in the ascertaining step. Furthermore, in the determining step, the illumination range of the at least one headlight may be determined, using the greater of the ascertained distances. If the at least one further, ascertained distance between the vehicle and the at least one further, illuminated road-marking feature is greater than the ascertained distance between the vehicle and the illuminated road-marking feature, the illumination range is determined using the at least one further, ascertained distance. If the ascertained distance between the vehicle and the illuminated road-marking feature is greater than the at least one further ascertained distance between the vehicle and the at least one further, illuminated road-marking feature, the illumination range is determined using the ascertained distance. Consequently, the illumination range is determined, using the distance from the detected road-marking feature furthest away from the vehicle. This exemplary embodiment provides the advantage that the illumination range may be determined correctly and reliably on the basis of the greatest distance from a detected road-marking feature.

The present invention further provides a method for calibrating a light emission of at least one headlight of a vehicle, the method having the following steps:

determining an illumination range of the at least one headlight according to the above-mentioned method;

combining the determined illumination range and a predefined illumination range, in order to generate a calibration value; and outputting a calibration signal representing the calibration value, in order to calibrate the light emission of the at least one headlight.

The light emission of the at least one headlight may be varied in steps or steplessly. The light emission of the at least one headlight may be characterized by a radiation characteristic of the at least one headlight. The radiation characteristic may include an illumination range, an illumination angle, a brightness and/or the like of the at least one headlight. In particular, the light emission of the at least one headlight may be calibrated, using a change in the illumination range or in the illumination angle of the at least one headlight. For example, the predefined illumination range may be based on legal regulations. In the combining step, e.g., a magnitude of a difference between the determined illumination range and the predefined illumination range may be ascertained. For example, the generated calibration value may represent this magnitude of the difference. Consequently, the calibration value may be an offset value, by which the light emission may be corrected, in order that the illumination range correspond to the predefined illumination range. Thus, the calibration value is suitable for adjusting the illumination range to the predefined illumination range when used in the calibration of the light emission or the control of the headlight. In this context, in the outputting step, the calibration signal may be outputted directly to the at least one headlight or a device for controlling the headlight. In this connection, the calibration signal may act as a control signal for the at least one headlight. Alternatively or additionally, in the outputting step, the calibration signal may be outputted to a driver of the vehicle in the form of a warning signal, for example, an optical and/or acoustic warning signal. The method for calibrating headlights may be carried out during the production of the vehicle, in order to set the headlights.

According to one exemplary embodiment, in addition to, or as an alternative to, the step of determining an illumination range, the method may include a step of determining a brightness characteristic of the at least one road-marking feature, in order to determine an estimated pitch angle of the vehicle. In the combining step, the estimated pitch angle may be combined with a measured pitch angle or a pitch rate, in order to generate the calibration value. The measured pitch angle may be based on motion data of the vehicle, for example, the pitch rate. The motion data may represent a pitching motion of the vehicle. The motion data may include data provided by an acceleration sensor or yaw rate sensor, or may be based on data acquired by an acceleration sensor or yaw rate sensor. The pitch rate may also be calculated from the camera image. In the case of unevenness of the road, a pitch-angle offset, at which the reflectors may just be seen or are just no longer visible, may be calculated by integrating the pitch rate. Therefore, motion data may also be estimated from camera images. For example, the motion data may include a measured pitch angle and/or a measured or calculated pitch rate of the vehicle. In addition, a value of the measured pitch angle may be predefined and made available to the method for use via an interface. A predefined value presents itself in the scope of the implementation of the method in a known testing environment. The at least one road-marking feature may be tracked over a plurality of images. A brightness characteristic of the at least one road-marking feature may be ascertained over the plurality of images. In particular, the image, in which the at least one road-marking feature has a maximum brightness caused by so-called flashing of the road-marking feature illuminated by the headlight, may be ascertained. The image, which represents the at least one road-marking feature at a maximum brightness, may be assigned an estimated pitch angle. In order to determine the estimated pitch angle, different known values or parameters may be accessed as a function of the situation. Possible data for determining the estimated pitch angle may include a distance between the headlight and the road-marking feature, a relative elevation difference between the headlight and the road-marking feature, an illumination characteristic of the headlight, as well as a position of the road-marking feature in the image. The road-marking feature may also be a reflector, which is mounted at a defined position and is situated in a production environment of the vehicle, in order to calibrate the headlight after installation in the vehicle. The measured pitch angle may be compared to or combined with the estimated pitch angle, in order to generate the calibration value or a further calibration value. The calibration value or the further calibration value may be used for calibrating the headlight in such a manner, that the estimated pitch angle and the measured pitch angle match or have approached one another. The determination of the estimated pitch angle may be carried out while the vehicle is moving. Alternatively, the vehicle may be stationary and may be raised for carrying out a pitching movement, or, as an alternative, the reflector device may be raised in a defined manner. Thus, according to this exemplary embodiment, the operating dynamics, in particular, the pitch angle, may be included in the calculation of the offset value. In this context, the excitation of the vehicle due to unevenness of the road is utilized, in order to use the changing optical range and, additionally or alternatively, the changing brightness for estimating the transmission angle.

The present invention further provides an apparatus that is configured to carry out or implement the steps of one of the above-mentioned methods. In particular, the apparatus may have devices, which are configured to execute one step each of one of the above-mentioned methods. The objective of the present invention may also be achieved quickly and efficiently by this exemplary variant of the present invention in the form of an apparatus.

In the case at hand, an apparatus may be understood as an electrical device or control unit that processes sensor signals and outputs control signals as a function thereof. The apparatus may have an interface that may take the form of hardware and/or software. In a hardware design, the interfaces may, for example, be part of a so-called system ASIC that contains various functions of the apparatus. However, it is also possible for the interfaces to be separate, integrated circuits or to be at least partially made up of discrete components. In a software design, the interfaces may be software modules that are present on a microcontroller in addition to other software modules, for example.

Additionally advantageous is a computer program product having program code, which is stored on a machine-readable medium, such as a semiconductor memory, a hard-disk memory or an optical memory, and is used to implement one of the above-mentioned methods, when the program is executed on a computer or an apparatus.

Exemplary embodiments of the present invention are explained in greater detail herein with reference to the accompanying drawings.

DETAILED DESCRIPTION

Figure 1:
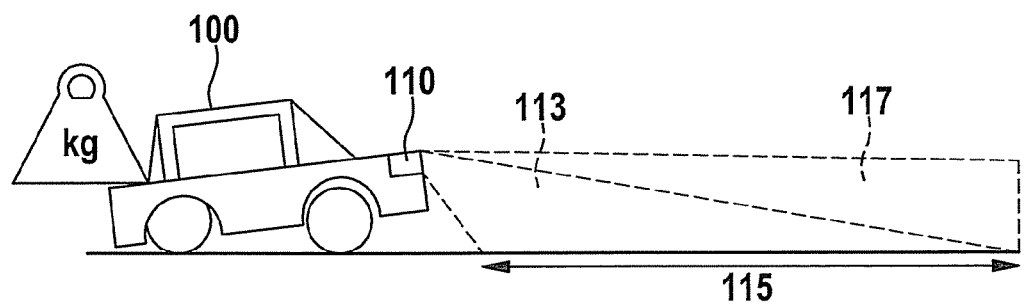
FIG. 1 illustrates a schematic representation of a vehicle on a roadway.

In the following description of preferred exemplary embodiments of the present invention, the same or similar reference numerals are used for the elements that are shown in the various figures and function similarly, while a repeated description of these elements is omitted.

FIG. 1 shows a side view of a vehicle 100 on a roadway. Vehicle 100 in FIG. 1 is a passenger car. Vehicle 100 includes a headlight 110, which has a light emission or a light cone 113 having an illumination range 115. Headlight 110 is a front headlight. Vehicle 100 may have, for example, two such headlights 110. Illumination range 115 may be an illumination range 115 in the case of a uniform load distribution in vehicle 100.

A weight, which rests on vehicle 100 in the region of a trunk situated at the rear end of the vehicle, is also symbolically shown in FIG. 1. The weight produces a one-sided load distribution in vehicle 100. The weight causes vehicle 100 to move about a transverse axis; with regard to the roadway, the vehicle sinking in the region of the trunk and rising in the region of headlight 110. This motion about the transverse axis due to the weight causes the illumination range or an illumination angle of the light cone generated by headlight 110 to change. Due to the weight, headlight 110 generates a changed light cone 117 having a changed illumination range. The additional weight causes an increase in illumination range 115 relative to a state without the resting weight.

Figure 2:
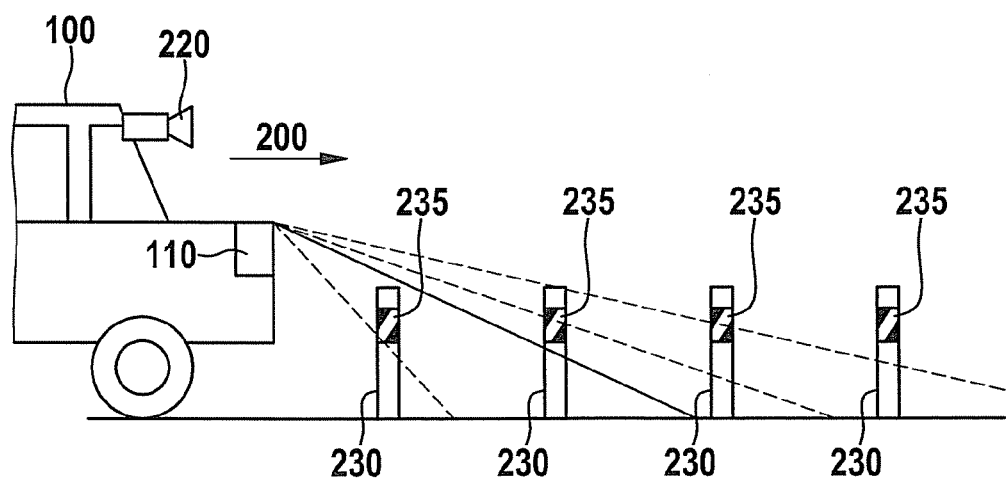
FIG. 2 illustrates a schematic representation of a vehicle on a roadway having road-marking features.

FIG. 2 shows a schematic representation of a vehicle 100 on a roadway having road-marking features. Vehicle 100 may be the vehicle from FIG. 1. Vehicle 100 has a headlight 110. A direction of travel 200, a vehicle camera 220 and, by way of example, four road-marking features in the form of guide posts 230 having reflector elements 235, are further shown in FIG. 2. In this context, each individual guide post 230 has a reflector element 235. Vehicle camera 220 is situated in vehicle 100. To be precise, vehicle camera 220 is situated in the region of a windshield of vehicle 100. A line of sight of vehicle camera 220 substantially corresponds to direction of travel 200. Guide posts 230 are positioned in a row at regular intervals in front of vehicle 100 and next to the roadway, in direction of travel 200.

The present invention's principle of detecting and using a relationship between a road-marking feature or guide post 230, in particular its reflector element 235, which is illuminated by headlight 110, and an illumination range of headlight 110, may be illustrated with reference to FIG. 2. To that end, four lines between headlight 110 and the roadway are shown in FIG. 2, the lines representing different illumination ranges of headlight 110. An individual line runs as a straight line from headlight 110, through one of the reflector elements 235 of guide posts 230, to the roadway. If, for example, reflector element 235 of the first or nearest guide post 230, when viewed from vehicle 100, and reflector element 235 of the second or second nearest guide post, when viewed from vehicle 100, are illuminated by headlight 110, then the illumination range of headlight 110 results in accordance with the line through the reflector element 235 of the second or second nearest guide post 230, when viewed from vehicle 100, thus, in this case, in accordance with the line through the reflector element of the furthest guide post 230 still illuminated by headlight 110.

Figure 3:
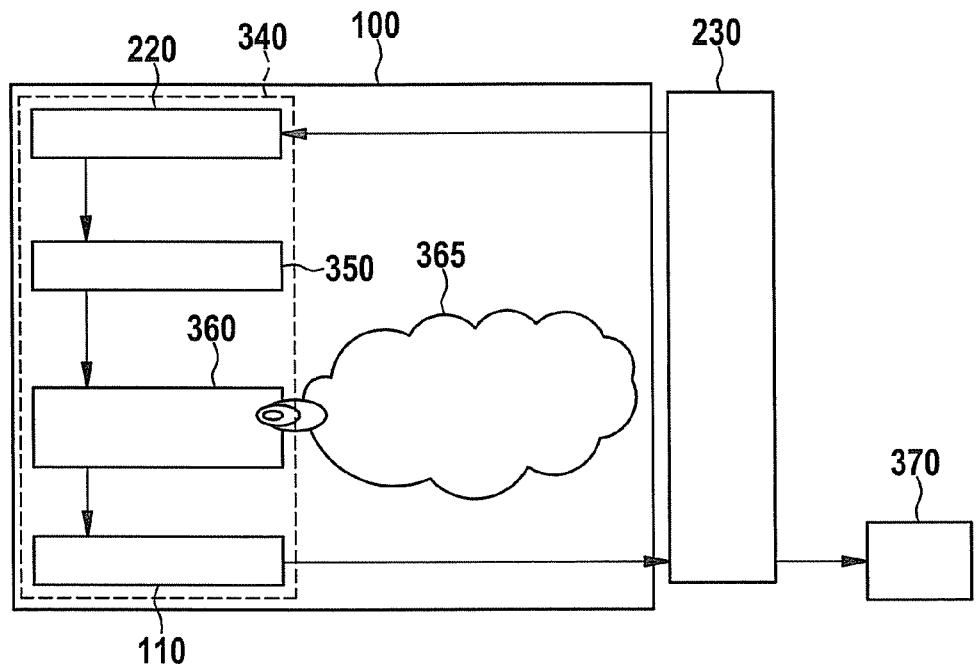
FIG. 3 illustrates a schematic representation of a vehicle having an apparatus according to an exemplary embodiment of the present invention.

FIG. 3 shows a schematic representation of a vehicle 100 having an apparatus for determining an illumination range and calibrating a headlight according to an exemplary embodiment of the present invention. Vehicle 100 may be the vehicle from FIG. 1 or FIG. 2. Vehicle 100 has a headlight 110 and a vehicle camera 220 or an image pick-up unit. Headlight 110 transmits light to a road-marking feature 230 in a surrounding area of vehicle 100, i.e., illuminates road-marking feature 230. Vehicle camera 220 receives light of headlight 110 reflected at road-marking feature 230. Vehicle 100 also has an active headlight system 340, which includes headlight 110, camera 220, an illumination-range determination device or illumination-range measuring device 350, a headlight control device 360 and a headlight calibration device 365. In this connection, illumination-range measuring device 350, headlight control device 360 and headlight calibration device 365 form the apparatus for determining an illumination range and calibrating a headlight according to an exemplary embodiment of the present invention. In addition, a driver 370 or his eye is shown in FIG. 3. Driver 370 or his eye also receives the light of headlight 110 reflected at road-marking feature 230.

Vehicle camera 220 is communicatively connected to illumination-range measuring device 350. Vehicle camera 220 is configured to generate an image of the surrounding area of vehicle 100. The road-marking feature 230 illuminated by headlight 110 is also reproduced in the image of the surrounding area of vehicle 100. Vehicle camera 220 is further configured to provide the picked-up image to illumination-range measuring device 350.

Illumination-range measuring device 350 is configured to receive the image from vehicle camera 220. Illumination-range measuring device 350 is connected to vehicle camera 220 and headlight control device 360 via a transmission interface. Illumination-range measuring device 350 is connected between vehicle camera 220 and headlight control device 360. Illumination-range measuring device 350 is configured to determine an illumination range of headlight 110 on the basis of the received image. To that end, illumination-range measuring device 350 may further receive sensor data and/or trip data from other vehicle devices and additionally use them for determining the illumination range, even if it is not illustrated in FIG. 3. Illumination-range measuring device 350 is configured to execute the steps of a method, such as of the method from FIG. 4. Illumination-range measuring device 350 generates measurement data that represent the determined illumination range of headlight 110. Illumination-range measuring device 350 is configured to provide the measurement data to headlight control device 360.

Headlight control device 360 is configured to receive, from illumination-range measuring device 350, the measurement data that represent the illumination range of headlight 110. Headlight control device 360 is communicatively connected to illumination-range measuring device 350 and headlight 110. Headlight control device 360 is connected between illumination-range measuring device 350 and headlight 110. Furthermore, headlight control device 360 may be connected to headlight calibration device 365 via a transmission interface. Alternatively or additionally, headlight calibration device 365 may be a part of headlight control device 360. Headlight control device 360 is configured to provide the measurement data representing the illumination range of headlight 110 to headlight calibration device 365.

Headlight calibration device 365 is configured to receive the measurement data representing the illumination range of headlight 110 from headlight control device 360. Even if it is not shown in FIG. 3, headlight calibration device 365 may also receive the measurement data directly from illumination-range measuring device 350. Headlight calibration device 365 is configured to generate a calibration signal for calibrating headlight 110 on the basis of measurement data, which represent the illumination range of headlight 110. In this context, headlight calibration device 365 is configured to execute the steps of a method, such as of the method from FIG. 5. Headlight calibration device 365 is configured to provide the calibration signal to headlight control device 360.

Headlight control device 360 is configured to receive the calibration signal from headlight calibration device 365. On the basis of the measurement data, which represent the illumination range of headlight 110, and/or on the basis of the calibration signal, headlight control device 360 is configured to generate a control signal or a setting instruction and output it to headlight 110. In this context, headlight control device 360 is configured to execute steps of a method, such as of the method from FIG. 5. The control signal or the setting instruction is designed to effect the control or calibration of the light emission of headlight 110. Thus, the control signal or the setting instruction, and consequently, the control and calibration of the light emission of headlight 110, is based on the illumination range determined by illumination-range measuring device 350, and alternatively, on the calibration signal generated by headlight calibration device 365, as well.

Different exemplary embodiments of the present invention are explained below in condensed fashion, with reference to FIGS. 1 through 3. Vehicle camera 220 picks up an image from the direction of travel and designates the reflector elements 235 of road-marking features 230 in the image. If a reflector element 235 exceeds a particular brightness or can actually be detected by the camera, it is assumed that it is illuminated by the at least one headlight 110. Using the distance between vehicle 100 and the illuminated reflector element, it may be checked if the transmission range or illumination range 115 of the at least one headlight 110 corresponds to the setpoint illumination range or calibrated illumination range. A variable number of reflector elements 235 is illuminated as a function of the calibration of the least one headlight 110. If it is monitored when a reflector element 235 lights up, and the distance from it is ascertained, then the optical range or illumination range 115 may be determined. The calibration of the least one headlight 110 with regard to illumination range 115 may take place online as follows. Vehicle camera 220 must also be calibrated upon installation in vehicle 100. In a special headlight calibration mode, if vehicle 100 is driven past reflector elements 235, headlights 110 may be set or calibrated with regard to illumination range 115 away from the factory. Therefore, different exemplary embodiments of the present invention are suitable for an end-of-line test or end-of-line calibration. Fine adjustment and continuous adaptation of illumination range 115 may take place on the road.

If the current headlight light distribution or illumination range 115 is fed back to the camera system or active headlight system 340, then AHC systems (AHC=adaptive headlight control) and other systems, which change the light distribution or illumination range 115, may also be calibrated. For low-beam light, there are regulations regarding how it must appear; therefore, the light distribution is generally known and usable. In addition to the visibility of reflector elements 235, the optical range of a lane detection system of vehicle 100 or other measuring algorithms of vehicle camera 220 may also be included, since the detection efficiency of camera-based systems at night, exactly like that of the driver, is directly linked to the headlight illumination.

Since camera systems in vehicles are becoming more and more widespread, such a camera may be used for determining the illumination range of the headlights. An uncalibrated system may be detected from the illumination range, which is linked to the calibration via the mounting height of the headlight, and a corresponding calibration signal may be outputted. For example, the calibration signal may be indicated to the driver as information, or may be outputted to the headlights, so that the same may be automatically adjusted. Thus, an optical range or illumination range may be determined, using road-marking features, such as boundary lines, guide posts and their reflectors, or the like. Therefore, headlight calibration may be accomplished, based on an optical range determination or illumination range determination at road-marking features.

According to one exemplary embodiment, vehicle data may be evaluated in combination with illumination data in an evaluating step. If a vehicle pitches or drives over a bump in the road, this may be seen in the camera or in images generated by the camera, and may be separately evaluated. In this context, "flashing" of the reflectors may be detected. If the reflection of the reflectors is simultaneously considered for ascertaining the vehicle data, then the pitch angle, at which the reflector is just no longer illuminated, may be detected using the differences in the reflections. In turn, the correction signal may be calculated from that.

Figure 4:
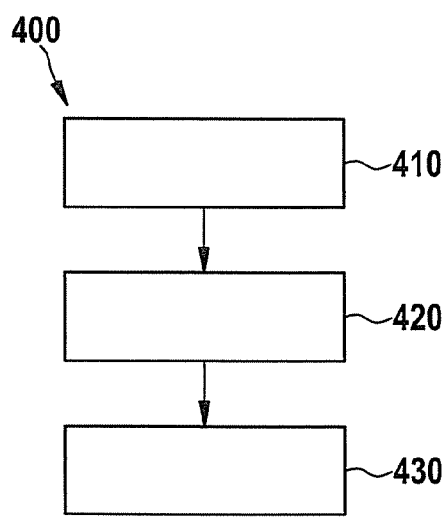
FIG. 4 illustrates a flow chart of a method according to an exemplary embodiment of the present invention.

FIG. 4 shows a flow chart of a method 400 for determining an illumination range of at least one headlight of a vehicle, according to an exemplary embodiment of the present invention. Method 400 has a step of detecting 410 at least one road-marking feature, which is illuminated by the at least one headlight. Method 400 further includes a step of ascertaining 420 a distance between the vehicle and the at least one illuminated road-marking feature. In addition, method 400 includes a step of determining 430 the illumination range of the at least one headlight, using the ascertained distance. Method 400 may be executed or implemented in conjunction with a vehicle from one of FIGS. 1 through 3. Method 400 may be executed or implemented in conjunction with the illumination-range measuring device of the vehicle from FIG. 3. In particular, the steps of the method may be implemented by suitable devices of an apparatus for determining an illumination range of at least one headlight of a vehicle.

Figure 5:
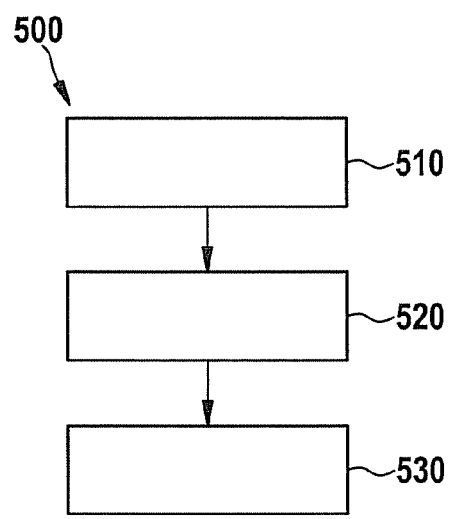
FIG. 5 illustrates a flow chart of a method according to an exemplary embodiment of the present invention.

FIG. 5 shows a flow chart of a method 500 for calibrating a light emission of at least one headlight of a vehicle, according to an exemplary embodiment of the present invention. Method 500 has a step of determining 510 an illumination range of the at least one headlight. In this context, the step of determining 510 may include partial steps, which correspond to the steps of the method for determining an illumination range of at least one headlight of a vehicle, as shown in FIG. 4. Method 500 additionally includes a step of combining 520 the determined illumination range and a predefined illumination range, in order to generate a calibration value. Alternatively or additionally, an estimated pitch angle of the vehicle may be determined in determining step 510. In this case, in combining step 520, the estimated pitch angle may be additionally or alternatively combined with a measured pitch angle and additionally or alternatively combined with a measured or calculated pitch rate, in order to generate the calibration value. Method 500 further includes a step of outputting 530 a calibration signal representing the calibration value, in order to calibrate the light emission of the at least one headlight. In this context, in outputting step 530, the calibration signal may be outputted directly to the at least one headlight or to a device for controlling the headlight as a control signal. Alternatively or additionally, in outputting step 530, the calibration signal may be outputted to a driver of the vehicle as a warning signal. Method 500 may be executed or implemented in conjunction with a vehicle from one of FIGS. 1 through 3. Method 500 may be executed or implemented in conjunction with the headlight control device and/or the headlight calibration device of the vehicle from FIG. 3.

The exemplary embodiments described and shown in the figures have been selected only as examples. Different exemplary embodiments are able to be fully combined with one another, or combined with one another with regard to individual features. An exemplary embodiment may also be supplemented by features of another exemplary embodiment. Furthermore, method steps of the present invention may be executed repeatedly, as well as in an order other than that described.

What is claimed is:

1. A method for determining an illumination range of at least one headlight of a vehicle, the method comprising:
   detecting a reflection of light from at least one road-marking feature, which is illuminated by the at least one headlight;
   making a threshold value decision, in order to check if a brightness value of the reflection is above or below a specifiable brightness threshold value;
   ascertaining a distance between the vehicle and the at least one illuminated road-marking feature as a function of the threshold value decision; and
   determining the illumination range of the at least one headlight, using the ascertained distance.

2. The method according to claim 1, wherein during the detecting, at least one of a guide post and a boundary line is detected as the at least one road-marking feature.

3. The method according to claim 1, wherein during the detecting, the at least one road-marking feature is detected using an image picked up by a vehicle camera.

4. The method according to claim 1, wherein during the ascertaining, the distance is ascertained on a basis of data of at least one of a distance sensor system, object tracking system, image evaluation unit, and trip data.

5. The method according to claim 1, wherein during the detecting, at least one further road-marking feature, which is illuminated by the at least one headlight, is detected; during the ascertaining, at least one further distance between the vehicle and the at least one further, illuminated road-marking feature is ascertained; and during the determining, the illumination range of the at least one headlight is determined, using a greater of the ascertained distances.

6. A method for calibrating a light emission of at least one headlight of a vehicle, the method comprising:
determining an illumination range of the at least one headlight by detecting a reflection of light from at least one road-marking feature, which is illuminated by the at least one headlight; making a threshold value decision, in order to check if a brightness value of the reflection is above or below a specifiable brightness threshold value; ascertaining a distance between the vehicle and the at least one illuminated road-marking feature as a function of the threshold value decision, and determining the illumination range of the at least one headlight, using the ascertained distance; and
combining the determined illumination range and a predefined illumination range, in order to generate a calibration value; and outputting a calibration signal representing the calibration value, in order to calibrate the light emission of the at least one headlight.

7. The method according to claim 6, further comprising:
determining a brightness characteristic of the at least one road-marking feature, in order to determine an estimated pitch angle of the vehicle; wherein during the combining, the estimated pitch angle is combined with at least one of a measured pitch angle and a pitch rate, in order to generate the calibration value.

8. An apparatus for determining an illumination range of at least one headlight of a vehicle, comprising:
an image pick-up unit; and
an illumination-range measuring device;
wherein the image pick-up unit detects and generates an image of a reflection of light from at least one road-marking feature, which is illuminated by the at least one headlight, and the illumination-range measuring device determines the illumination range of the at least one headlight by making a threshold value decision, in order to check if a brightness value of the reflection is above or below a specifiable brightness threshold value;
ascertaining a distance between the vehicle and the at least one illuminated road-marking feature as a function of the threshold value decision, and determining the illumination range of the at least one headlight, using the ascertained distance.

9. A non-transitory computer-readable medium having a computer program, which is executable by a processor, comprising:
a program code arrangement having program code for determining an illumination range of at least one headlight of a vehicle, by performing the following:
detecting a reflection of light from at least one road-marking feature, which is illuminated by the at least one headlight;
making a threshold value decision, in order to check if a brightness value of the reflection is above or below a specifiable brightness threshold value;
ascertaining a distance between the vehicle and the at least one illuminated road-marking feature as a function of the threshold value decision; and
determining the illumination range of the at least one headlight, using the ascertained distance.

10. The computer-readable medium according to claim 9, wherein during the detecting, at least one of a guide post and a boundary line is detected as the at least one road-marking feature.

11. The computer-readable medium according to claim 9, wherein during the detecting, a reflection of light, emitted by the at least one headlight, at a reflector element of the at least one road-marking feature is detected.

12. The computer-readable medium according to claim 11, further comprising:
making a threshold value decision, in order to check if a brightness value of the reflection is above or below a specifiable brightness threshold value;
wherein during the ascertaining, the distance is ascertained as a function of the threshold value decision.

13. The computer-readable medium according to claim 9, wherein during the detecting, the at least one road-marking feature is detected using an image picked up by a vehicle camera.

14. The computer-readable medium according to claim 9, wherein during the ascertaining, the distance is ascertained on a basis of data of at least one of a distance sensor system, object tracking system, image evaluation unit, and trip data.

15. The computer-readable medium according to claim 9, wherein during the detecting, at least one further road-marking feature, which is illuminated by the at least one headlight, is detected wherein during the ascertaining, at least one further distance between the vehicle and the at least one further, illuminated road-marking feature is ascertained, and wherein during the determining, the illumination range of the at least one headlight is determined, using a greater of the ascertained distances.

16. The computer-readable medium according to claim 9, wherein during the detecting, the at least one road-marking feature is detected using an image picked up by a vehicle camera, and wherein during the ascertaining, the distance is ascertained on a basis of data of at least one of a distance sensor system, object tracking system, image evaluation unit, and trip data.

* * * * *